US008331425B2

(12) United States Patent
Nicolas et al.

(10) Patent No.: US 8,331,425 B2
(45) Date of Patent: Dec. 11, 2012

(54) APPARATUS, SYSTEM AND METHOD FOR PROVIDING A MULTIPLE INPUT/MULTIPLE OUTPUT (MIMO) CHANNEL INTERFACE

(75) Inventors: Julien Nicolas, San Diego, CA (US); Amit Kalhan, La Jolla, CA (US)

(73) Assignee: KYOCERA Corporation, Kyoto (JP)

( * ) Notice: Subject to any disclaimer, the term of this patent is extended or adjusted under 35 U.S.C. 154(b) by 906 days.

(21) Appl. No.: 11/363,766

(22) Filed: Feb. 28, 2006

(65) Prior Publication Data

US 2007/0201536 A1 Aug. 30, 2007

(51) Int. Cl.
*H04B 1/38* (2006.01)

(52) U.S. Cl. ........ 375/219; 375/260; 375/262; 375/267; 375/295; 375/296

(58) Field of Classification Search .................. 375/141, 375/267, 219, 260, 262; 455/73; 370/276
See application file for complete search history.

(56) References Cited

U.S. PATENT DOCUMENTS

| | | | |
|---|---|---|---|
| 7,301,924 B1 * | 11/2007 | Gurbuz et al. ................. 370/335 |
| 7,333,455 B1 * | 2/2008 | Bolt et al. ...................... 370/334 |
| 7,403,508 B1 * | 7/2008 | Miao .............................. 370/335 |
| 7,430,397 B2 * | 9/2008 | Suda et al. ......................... 455/7 |
| 7,515,878 B2 * | 4/2009 | Zhang et al. .................... 455/69 |
| 2003/0124976 A1 | 7/2003 | Tamaki et al. |
| 2003/0235146 A1 | 12/2003 | Wu et al. |
| 2004/0114618 A1 | 6/2004 | Tong et al. |
| 2004/0131025 A1 | 7/2004 | Dohler et al. |
| 2005/0042999 A1 | 2/2005 | Rappaport |
| 2005/0130587 A1 | 6/2005 | Suda et al. |
| 2006/0274844 A1 * | 12/2006 | Walton et al. .................. 375/260 |
| 2007/0041428 A1 * | 2/2007 | Wang et al. .................... 375/146 |
| 2007/0133691 A1 * | 6/2007 | Kozat ......................... 375/240.24 |
| 2009/0274239 A1 * | 11/2009 | Efimov et al. ................. 375/285 |

FOREIGN PATENT DOCUMENTS

| | | |
|---|---|---|
| EP | 1 592 185 A | 2/2005 |
| JP | 2003-198442 | 7/2003 |
| JP | 2004-135235 A | 4/2004 |
| JP | 2004-179801 A | 6/2004 |
| JP | 2005-510939 A | 4/2005 |
| JP | 2005-192185 | 7/2005 |
| JP | 2005-522086 A | 7/2005 |
| JP | 2007-067726 A | 3/2007 |
| WO | WO 2004/023720 A | 3/2004 |

(Continued)

OTHER PUBLICATIONS

Abstract: "Radio Transmission System for Performing Multi-Spot Relay and Radio Equipment to be Used Therefor", JP 2003-198442, Hitachi Ltd.

(Continued)

*Primary Examiner* — Dhaval Patel (57) ABSTRACT

A system, method and apparatus, provide for the utilization of the MIMO technique with single-antenna communication devices that maximize high-speed broadband communication. The apparatus includes a wireless communication interface (WCI) device configured to exchange wireless signals with a base station through a multiple input multiple output (MIMO) air interface and to exchange a corresponding set of wireless signals with an access terminal through a wideband air interface having a greater bandwidth than the bandwidth of the MIMO air interface. The system includes a plurality of WCI devices communicating with the base station and exchanging corresponding signals with the access terminal.

21 Claims, 5 Drawing Sheets

FOREIGN PATENT DOCUMENTS

| | | |
|---|---|---|
| WO | 2005-067173 A1 | 7/2005 |
| WO | 2005-115022 A2 | 12/2005 |
| WO | 2007-100747 A2 | 7/2007 |

OTHER PUBLICATIONS

Abstract: "Radio Repeater and Radio Relay Transmission Method", JP 2005-192185, NTT DOCOMO Inc.

Barbarossa et al., "Cooperative diversity through virtual arrays in multihop networks", 2003 IEEE Int. Conf. on Acoustics, Speech, and Signal Processing Proceedings, Apr. 6, 2003, ISBN: 0-7803-7663-3.

Dohler et al., "Higher order space-time block codes for virtual antenna arrays" Int. Conf., Feb. 23, 2004, ISBN: 0-7803-7661-7.

Christoph Windpassinger, et al., "Processing in Multiantenna and Multiuser Communications", IEEE Transactions on Wireless Communications, vol. 3, No. 4, Jul. 2004, p. 1305.

Robert F.H. Fischer, et al., "Tomlinson-Harashima Precoding in Space-Time Transmission for Low-Rate Backward Channel", Broadband Communications, 2002. Access, Transmission, N.

* cited by examiner

APPARATUS, SYSTEM AND METHOD FOR PROVIDING A MULTIPLE INPUT/MULTIPLE OUTPUT (MIMO) CHANNEL INTERFACE

FIELD OF THE INVENTION

The invention relates in general to wireless communication devices and more specifically to a device, system and method for providing a MIMO channel interface.

BACKGROUND OF THE INVENTION

A recently developed technology known as multiple-input/multiple output (MIMO) is emerging as a key technology enabler for high-speed broadband communications. This technology is especially useful for communication channels that are bandwidth and power-limited. It relies on the use of multiple transmit and receiver antennas to achieve very large capacity gains compared to single transmit/receive antenna systems.

It has been shown that extremely high spectral efficiencies can be achieved without bandwidth expansion when the communication channel has sufficiently rich scattering characteristics and the antennas at both transmit and receive ends are separated by sufficient distances. A feature of MIMO technique is that MIMO processing effectively creates multiple independent parallel communication channels within the same frequency band by using multiple transmit and receive antennas and exploiting the scattering characteristics of the transmission medium. Studies and experiments have shown that capacity gains from MIMO techniques depend heavily on the channel gain correlations at the different receive antennas as well as the ability to estimate those gains accurately. Typically, a separation between antenna elements on the order of several wavelengths is required to provide sufficient decorelation between channel gains. This is especially problematic in the case of handheld devices and other devices whose physical dimensions limit the number and separation of multiple receive antenna elements.

Accordingly, there is a need for a device, system and method that provide for the utilization of MIMO communication systems with single-antenna communication devices.

SUMMARY OF THE INVENTION

A system, method and apparatus, provides an interface between a MIMO communication system and single-antenna communication devices. The apparatus includes a wireless communication interface (WCI) device configured to exchange wireless signals with a base station through a multiple input multiple output (MIMO) air interface and to exchange a corresponding set of wireless signals with an access terminal through a wideband air interface having a greater bandwidth than the bandwidth of the MIMO air interface. A downlink transceiver is configured to transmit wideband downlink signals to the access terminal corresponding to downlink MIMO signals received from the base station through the MIMO air-interface. In the exemplary embodiment, the apparatus includes a second transceiver configured to transmit uplink MIMO signals to the base station corresponding to uplink wideband signals received from the access terminal. The system includes a plurality of WCI devices communicating with the base station and exchanging corresponding signals with the access terminal. Each wireless communication interface device is configured to measure channel characteristics between each WCI device and the base station transmit antennas and to send channel state information corresponding to the channel characteristics to the base station. Based on the channel state information, the MIMO base station precodes the downlink MIMO signals allowing the WCI to receive and process the downlink signals independently.

DETAILED DESCRIPTION

In the exemplary embodiment, at least two WCI devices are geographically distributed within a communication range of a base station. Each WCI device exchanges wireless signals with the base station through a MIMO air interface. Each WCI device receives wireless downlink MIMO signals transmitted from multiple antennas of the base station, such as an access node, through a MIMO frequency bandwidth. The WCI devices demodulate and decode the downlink MIMO signals. The resulting signals are coded, modulated and transmitted through a wideband air interface such as an ultra wideband (UWB) communication channel that has a wider frequency bandwidth than the MIMO frequency bandwidth. The access terminal receives and processes the downlink wideband signals transmitted from the WCI devices to recover the information transmitted by the base station. The WCI devices demodulate and decode uplink wideband signals transmitted from the access terminal and transmit corresponding uplink MIMO signals to the base station.

Figure 1:
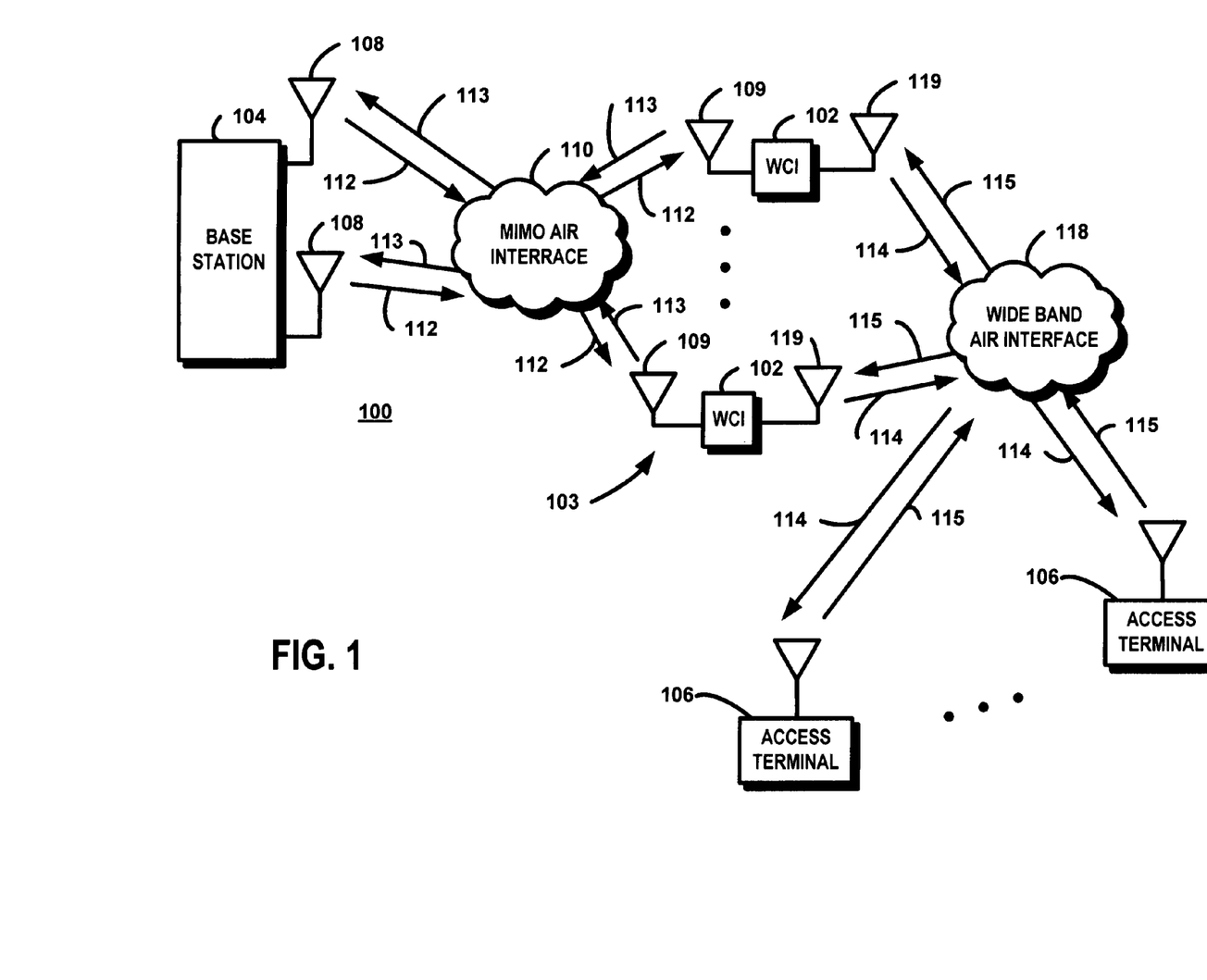
FIG. 1 is a block diagram of a wireless communication network in accordance with an exemplary embodiment of the invention.

FIG. 1 is a block diagram of wireless communication network 100 in accordance with an exemplary embodiment of the invention. An arrangement of wireless communication interface (WCI) devices 102 forming a wireless communication interface system 103 can communicate with at least one base station (BS) 104 and at least one access terminal 106. Although the base station 104 is stationary in the exemplary embodiment, the base station 104 may be a mobile unit in some circumstances. The access terminal 106 may be a single-antenna device such as a cellular telephone, wireless modem, personal digital assistant (PDA) or other device that exchanges electromagnetic signals with a fixed or portable communication device. In the exemplary embodiment, the access terminal 106 includes hardware, software, and firmware not shown in FIG. 1 for facilitating and performing the functions of the access terminal 106. For example, the access terminal 106 includes input and output devices such as keypads, displays, microphones and speakers. As described in further detail below, the BS 104 includes an arrangement of antennas 108 in order to support multiple-input/multiple output (MIMO) communication with the WCI devices 102 in the exemplary embodiment. The WCI devices 102 each include at least one antenna 109 for transmitting and receiving signals with the base station 104 and at least another antenna 119 for exchanging signals with the access terminal 106. In some situations, a single antenna may be used. Further, multiple antennas may be used to facilitate communication through the MIMO air interface. Although FIG. 1 shows two WCI devices 102 providing communication services to two access terminals 106, any number of WCI devices 102 may provide services to any number of access terminals 106.

A communication channel illustrated as a MIMO air-interface 110 provides a medium where downlink MIMO signals 112 and uplink MIMO signals 113 are exchanged between the BS 104 and each of the WCI devices 102. The communication channel may include buildings, automobiles, and other objects that cause the deflection of the communication signals and result in a rich scattering of the communication signals. In the exemplary embodiment, MIMO signals 112, 113 are exchanged through the MIMO air-interface 110 within a MIMO frequency bandwidth such as a narrowband (NB) frequency bandwidth. The MIMO signals may be transmitted in accordance with any of several communication or modulation techniques. MIMO processing is a key aspect of most upcoming wireless systems, including next generation cdma2000 systems (e.g. EV-DO Phase 2), next generation WCDMA systems (e.g. WCDMA Long Term Evolution (LTE)), wireless local area network (WLAN) systems such as IEEE 802.11 (first introduced in 802.11n), WiMAX (mobility enhancements in IEEE 802.11e) and Mobile Broadband Wireless Access (IEEE 802.20).

The downlink MIMO signals 112 received by each WCI device 102 are processed and retransmitted as downlink wideband signals 114 through the wideband air interface 118 to the access terminal 106. The bandwidth of the wideband air interface 118 is greater than the MIMO frequency bandwidth. In the exemplary embodiment, the wideband air interface 118 is an interface in accordance with any communication scheme characterized as ultra wideband (UWB). Examples of suitable modulation and access techniques for the wideband air interface 118 include orthogonal frequency division multiple access (OFDMA) schemes and direct sequence techniques such as code division multiple access (CDMA). In the exemplary embodiment, the wideband air interface 118 provides for short-range, low-power, high-data rate communication that can be utilized with single-antenna user devices. Accordingly, communications through the wideband air interface typically have lower spectral densities than communication over the MIMO channel.

Uplink wideband signals 115 are transmitted by the access terminal 106 using different channels of the wideband air interface. The WCI devices 102 receive the uplink wideband signals 115 and transmit corresponding uplink MIMO signals 113 to the base station 104 through the MIMO air interface.

Accordingly, the exemplary embodiment provides for the implementation of a plurality of WCI devices 102 that enable high-speed broadband communication between at least one single-antenna access terminal 106 and a MIMO BS 104. The use of short-range, low-power, and high-data rate feature of the UWB technology can provide for high-speed broadband communication with the access terminal 106 for effectively utilizing MIMO technology in locations where a system 103 of WCI devices 102 can be installed in close proximity to the access terminal 106. For example, the system 103 of WCI devices 102 can be installed around the house of a user allowing for a high-speed broadband communication between the access terminal 106 and the BS 104 through the system of WCI devices 102. Examples of other suitable locations for installing the system 103 of WCI devices 102 includes shopping malls, airports, train stations, buses, cars or other locations where there are high levels of human traffic and the user devices are in close proximity to the WCI devices 102. Therefore, by combining the strengths of the NB MIMO and UWB communication, the exemplary embodiment provides for high-speed broadband communication between a single-antenna access terminal 106 and a base station 104 communicating using MIMO techniques. The exemplary system provides a method for trading off spectrum bandwidth and space since the MIMO channel and the UWB channel support the same overall data rate (or channel capacity). However, the MIMO channel achieves a high data rate by spatially multiplexing multiple conventional single-input single output channels, thus achieving very high spectral efficiency (bits/s/Hz). The UWB channel achieves a high data rate by using a very large spectrum bandwidth. The system has the additional advantage that the estimation of the MIMO channel parameters required at the receiver or transmitter is simplified compared to the case where the multi-antenna system is part of the access terminal, since the WCI devices will typically be stationary or following a predictable path (e.g. located on a train or plane) whereas the access terminal might not. Another advantage is that the estimation of the MIMO channel parameters is performed by the BS and the WCI devices, not the access terminals. Thus, in a multi-access configuration, the channel estimation task does not need to be performed on a per access terminal basis.

As explained above, the MIMO technique requires multiple antennas on a device separated by a distance of several wavelengths. Most user devices are single-antenna devices or if they are multiple-antenna devices, the antennas are not separated by several wavelengths. Such user devices may not operate and communicate in a MIMO communication environment. Conventional access terminals cannot benefit from the advantages of conventional MIMO communication. The exemplary embodiment provides a technique for realizing those advantages. The exemplary communication system may be viewed as a distributed antenna and transceiver network that is wirelessly connected to the access terminal 106. Since each WCI device 102 includes at least one antenna and a transceiver, the MIMO signals may be processed with the advantage of separated antennas to fully utilize the MIMO environment. The information is forwarded to the access terminal 106 using a short distance, low power, air interface that can easily be processed with single antenna.

In the exemplary embodiment, the WCI devices 102 operate independently. Processing in conventional MIMO receivers requires information received from multiple antennas to be processed as an aggregate set of information. In the exemplary embodiment, however, the transmitted downlink MIMO signals 112 are precoded at the base station 104 based on channel characterizations obtained from the WCI devices 102. By precoding the transmissions, each WCI device 102 can independently process the incoming downlink MIMO signals 112 and forward the information to the access terminal 106 as if the WCI devices 102 were operating as a single unit. Precoding at the base station 104 is discussed in further detail below.

Figure 2:
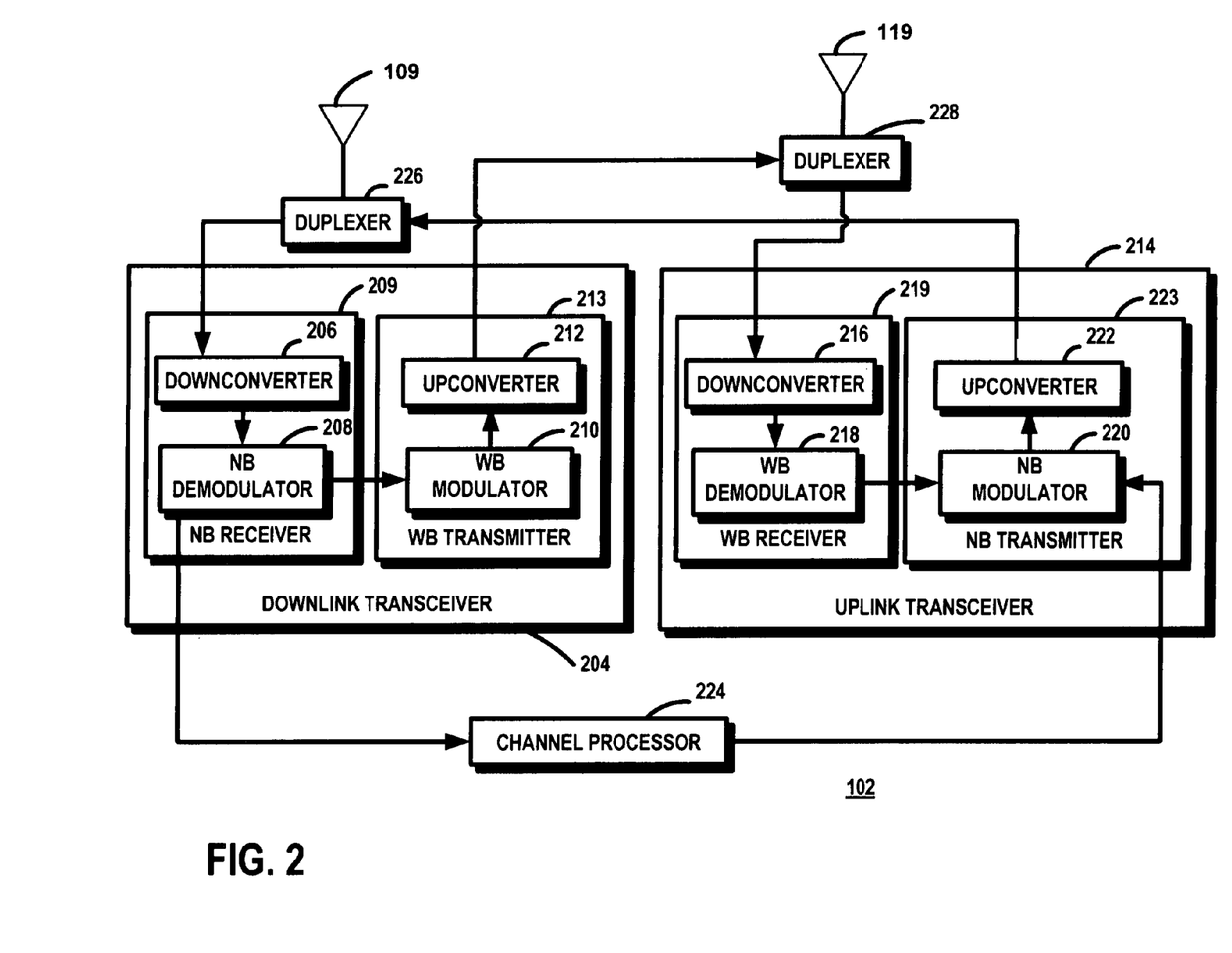
FIG. 2 is a block diagram of a wireless communication interface device in accordance with the exemplary embodiment of the invention.

FIG. 2 is a block diagram representation of the WCI device 102 in accordance with the exemplary embodiment of the invention. The functions and operations of the blocks described in FIG. 2 may be implemented in any number of devices, circuits, or elements. Two or more of the functional blocks may be integrated in a single device and the functions described as performed in any single device may be implemented over several devices. For example, software running on a processor within the WCI device 102 may perform at least some of the functions of the demodulators 208, 218 and the modulators 210, 220.

The WCI device 102 includes at least one transceiver 204, 214 that can receive and transmit MIMO and wideband signals. In the exemplary embodiment, the WCI device 102 includes a downlink transceiver 204 and an uplink transceiver 214. The downlink transceiver 204 receives downlink MIMO signals 112 from the MIMO base station 104 through the MIMO antenna 109 and transmits corresponding downlink wideband signals 114 to the access terminal 106 through the other antenna 119. The uplink transceiver 214 receives uplink wideband signals 115 from the access terminal 106 through the wideband antenna 119 and transmits corresponding uplink MIMO signals 113 to the MIMO base station 104 through the MIMO antenna 109. The antennas 109 and 119 are connected to the downlink transceiver 204 and uplink transceiver 214 through associated duplexers 226 and 228. The downlink transceiver 204 includes a narrow band receiver 209 and a wideband transmitter 213 and the uplink transceiver 214 includes a wideband receiver 219 and a narrow band transmitter 223. A downconverter 206 in the NB receiver 209 frequency shifts the incoming downlink MIMO signal to baseband. The NB demodulator 208 demodulates the baseband signal to recover the transmitted data symbols. The data is forwarded to the wideband modulator 210 in the wideband transmitter 213 where it is modulated in accordance with the appropriate wideband modulation technique. An upconverter 212 frequency shifts the modulated signal to the RF signal for transmission to the access terminal 106. The downlink wideband signals are transmitted through the duplexer 228 and the wideband antenna 119 to access terminal 106. In some circumstances, the functions of the wideband transmitter 213 may include spreading the baseband signal with a PN code such as in direct sequence spread spectrum techniques.

A downconverter 216 in the wideband receiver 219 frequency shifts the uplink wideband signal 115 transmitted from the access terminal 106 and received through the wideband antenna 119 from RF to baseband. The wideband demodulator 218 demodulates the baseband signal to receive the data symbols. The data is modulated by the narrow band modulator 220, frequency shifted by the upconverter 222 to RF signals and transmitted to the base station 104 through the MIMO antenna 109. In some circumstances, the wideband receiver 219 applies a PN code to despread the incoming uplink wideband signal. The RF signals are uplink MIMO signals having, for example, a narrow band bandwidth that are transmitted through the duplexer 226 and MIMO antenna 109 to base station 104.

Accordingly, in the exemplary embodiment, downlink MIMO signals 112 are received by each of the WCI devices 102 from the base station 104 and converted to downlink wideband signals 114 and further transmitted to the access terminal 106. Also, the uplink wideband signals 115 received from the access terminal 106 by each of the WCI devices 102 are converted to uplink MIMO signals 113 and further transmitted to the base station 104.

In the exemplary embodiment, the WCI device 102 also includes a channel processor 224 that is connected to the NB receiver 209 for monitoring the downlink MIMO signals 112 from the base station 104. The channel processor 224 is configured to measure the channel characteristics between the WCI device 102 and the transmission antennas 108 of the base station 104. Examples of parameters that may be monitored include signal strength, signal phase, and delays between multiple signal versions of downlink MIMO signals 112. The channel processor 224 determines channel state information (CSI) from the channel characteristics and communicates the CSI to the NB modulator 220 of the uplink transceiver 214 through which the CSI is transmitted to the base station 104. The CSI may include raw data measurements in some circumstances. Transmitting the CSI to the base station 104 allows the base station 104 to perform at least some of the MIMO processing normally performed by a conventional MIMO receiver. The base station 104 precodes signals to compensate for the channel characteristics allowing the WCI devices 102 receive signals without information from other WCI devices 102. Accordingly, each WCI device 102 can operate independently from other WCI devices 102.

Figure 3:
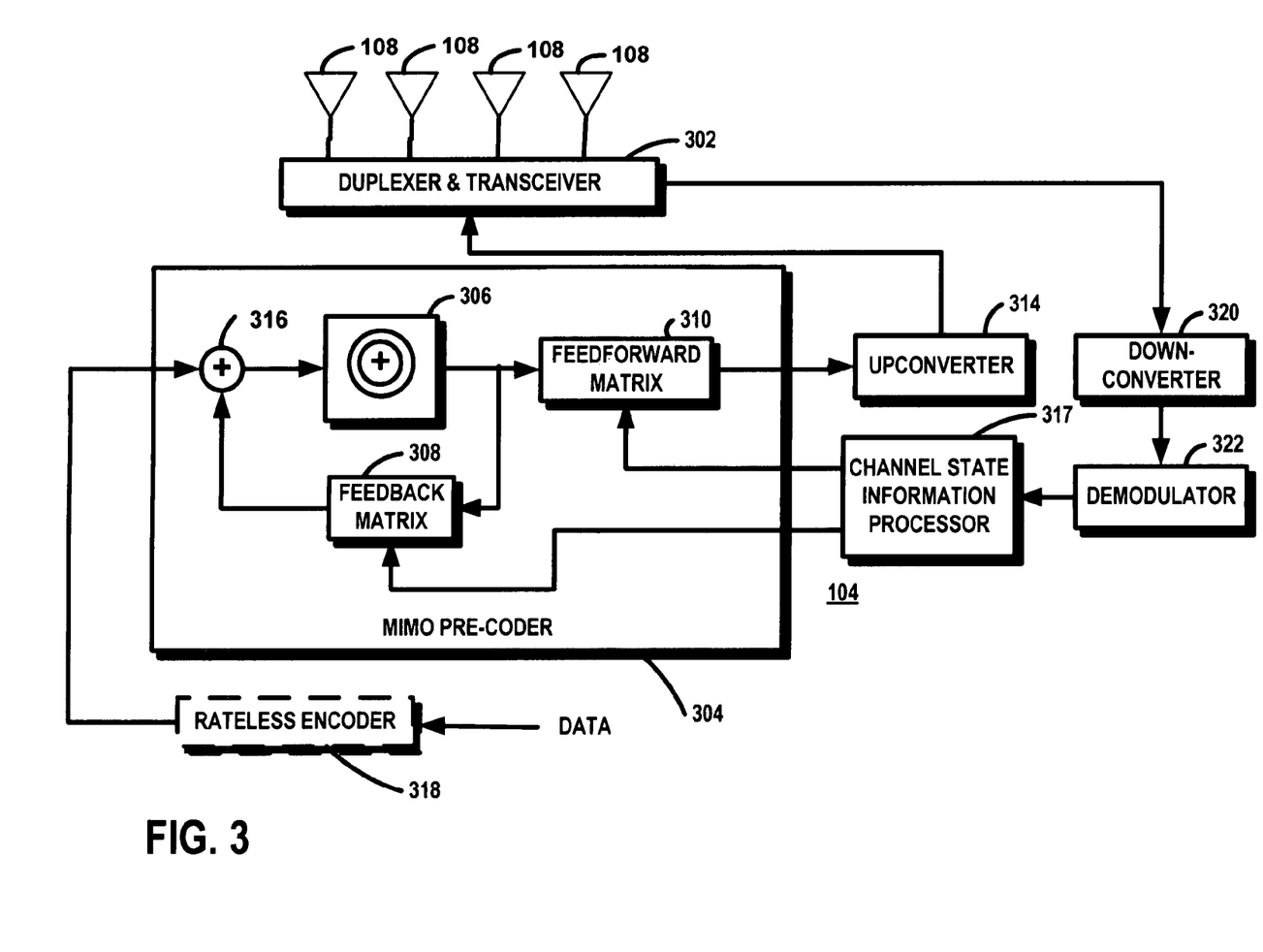
FIG. 3 is a block diagram of a base station in accordance with the exemplary embodiment of the invention.

FIG. 3 is a block diagram representation of a base station 104 in accordance with the exemplary embodiment of the invention. The functions and operations of the blocks described in FIG. 3 may be implemented in any number of devices, circuits, or elements. Two or more of the functional blocks may be integrated in a single device and the functions described as performed in any single device may be implemented over several devices.

A MIMO precoder 304 in the base station 104 processes the data in accordance with a precoding scheme based on the channel characteristics associated with each WCI device 102. In the exemplary embodiment, outgoing data is processed by a rateless encoder 318 before precoding in the MIMO precoder 304. The rateless encoder 318 provides a mechanism to more securely transmit information and is shown as a dashed line block to illustrate that the rateless encoder 318 may not be used in some implementations. Rateless coding has been shown to be very effective when multiple unreliable channels exist between a transmitter and a receiver, and has been proposed for the transmission of broadcast and multicast information over the Internet. MIMO communication can be viewed as a method to provide a number of parallel, independent communication channels corresponding to the different eigenvectors of the MIMO channel. In a Rayleigh fading environment, the MIMO channel can be described by a matrix of complex, zero-mean, Gaussian, independent random variables, and as a result, each of the eigenmodes undergoes fading. Rateless coding is ideally suited for MIMO communication because it inherently exploits the existence of multiple paths between transmitter and receiver, to achieve high reliability with little overhead.

Since multiple signals are transmitted through multiple channels to multiple WCI devices 102, the operations of the MIMO precoder are matrix operations. Precoding is a transmitter-side equalization technique that is the counterpart of the better-known receiver-side decision feedback equalization technique. Analogous to decision feedback equalization, it generally consists of two parts, a feedforward portion and a feedback portion. The feedforward and feedback parts can be designed according to a variety of criteria. For example, the feedforward and feedback parts may be chosen such that the overall effect of feedforward, feedback and channel processing make the MIMO channel appear as a set of M independent, unit-gain channels (where M is the number of receive devices). In this case, the feedforward part is designed such that the combination of feedforward processing with the MIMO channel matrix results is a lower triangular matrix. This makes it possible for the feedback part to successively cancel the remaining interference in the case of decision feedback equalization, or to successively pre-equalize the different signals for the different transmit antennas in the case of transmit-side precoding. Another criterion, which leads to another choice of the feedforward and feedback parts, is to minimize the overall effect of the MIMO channel and receiver noise. When precoding includes a modulo device, it is referred to, by those skilled in the art, as Tomlinson-Harashima precoding. The purpose of this modulo device is to reduce the total transmit power without affecting the other properties of the transmitted signals, e.g. the fact that when transformed by the MIMO channel, the outputs appear as M independent, unit-gain communication channels. In the exemplary embodiment of FIG. 3, the data to be transmitted is combined through a summer 316 with an output of a feedback matrix unit 308 and forwarded to a modulo device 306. The output of the modulo device 306 is forwarded to a feedforward matrix unit 310 and the feedback matrix unit 308. The matrix devices 308 and 310 together with the vector modulo device 306 and vector summer 316 implement Tomlinson-Harashima precoding and provide the appropriate processing to allow independent receiver-side demodulation and decoding in each of the WCI units. Channel state information is received by down-converting and demodulating the incoming signals in a downconverter 320 and demodulator 320. Based on the channel state information received from the WCI devices 102, a channel state information processor 317 determines the appropriate parameters of the matrix units 308, 310. The CSI processor 317 provides appropriate values to the matrix units 308, 310 to correspondingly change the values in each matrix unit such that output signals from the feedforward matrix unit 310 are appropriately transformed and compensate for the channel conditions with each WCI device 102. Therefore, each WCI device 102 receives precoded data from the base station 104 that enables each WCI device 102 to independently exchange signals between the base station 104 and the access terminal 106. The precoded signals are frequency shifted by an upconverter 314 before transmission by a transceiver 302 through the appropriate antenna 108.

Figure 4:
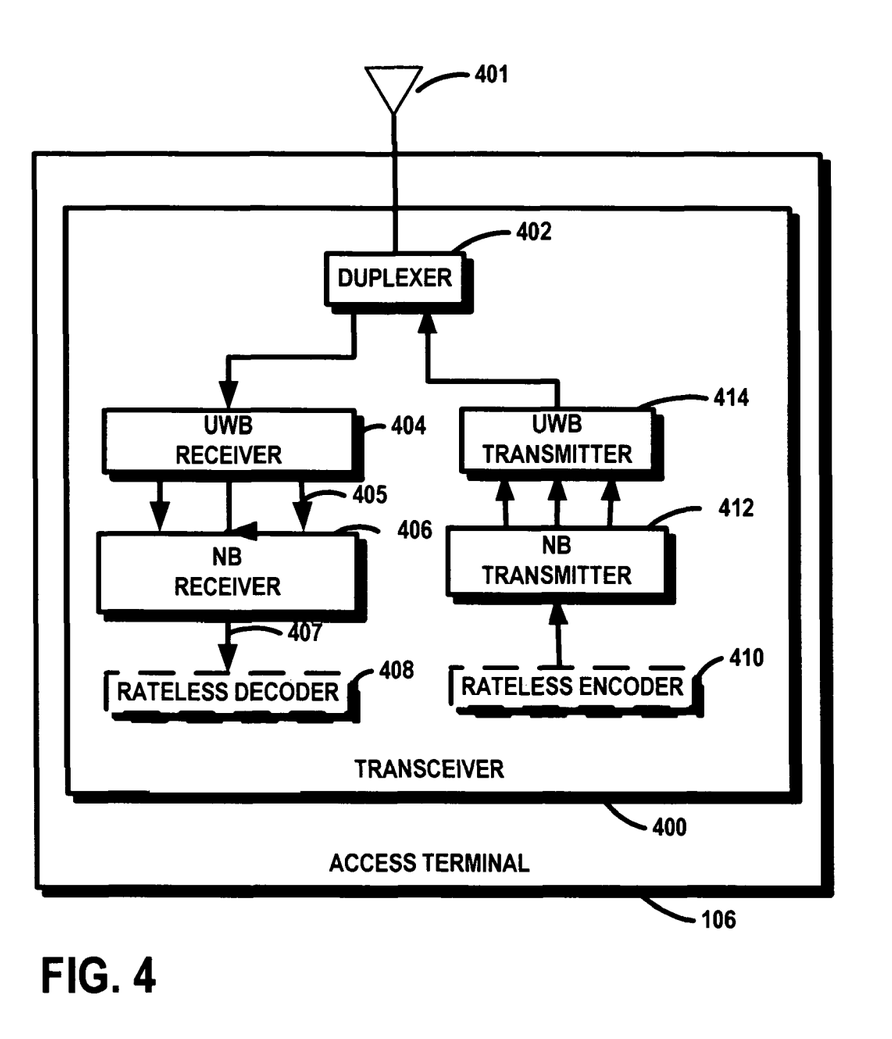
FIG. 4 is a block diagram of an access terminal in accordance with the exemplary embodiment of the invention.

FIG. 4 is a block diagram of an access terminal 106 in accordance with the exemplary embodiment of the invention. Wideband signals are transmitted and received through an antenna 401. A transceiver 400 includes a duplexer 402 coupled to the antenna 401, and a wideband receiver 404, a NB receiver 406, a NB transmitter 412, and a wideband transmitter 414. In some circumstances, the access terminal 106 of the exemplary embodiment may comprise a rateless decoder 408 and a rateless encoder 410 (shown as dashed line blocks). In the exemplary embodiment, the access terminal 106 through the wideband receiver 404 receives from the plurality of WCI devices 102 a plurality of downlink wideband signals 114 corresponding to a plurality of downlink MIMO signals 112. The wideband receiver 404 is configured to separate the received downlink wideband signals 114 and generate corresponding baseband (BB) signals 405. Since several WCI devices 102 may be communicating with the access terminal 106 at the same time, different received downlink wideband signals 114 can be distinguished from one another using techniques such as frequency-hopping or spreading with a pseudo noise PN code. The NB receiver 406 is connected to the wideband receiver 404 for receiving the baseband signals and processing the baseband signals to recover information. It should be noted that the NB receiver 406 may include a NB processor and a multiplexer (not shown) that can process and multiplex the received BB signals and provide a resultant signal in the form of a high data rate signal 407 which can be decoded by the access terminal 106. As explained above, the exemplary embodiment access terminal 106 may include the rateless decoder 408 if the base station 104 transmits rateless encoded downlink MIMO signals 112. In that situation the high data rate signal 407 may be decoded by the rateless decoder 408.

For uplink communication with the WCI devices 102, the transceiver 400 of the access terminal 106 may utilize the rateless encoder 410 for encoding the uplink signals. The NB transmitter 412 generates a plurality of uplink communication signals corresponding to NB signals. The wideband transmitter 414 connected to the NB transmitter 412 is configured to transmit different uplink wideband signals 115 corresponding to the uplink communication signals received from the NB transmitter 412. The access terminal 106 is further configured to transmit a different uplink wideband signal 115 to each of the WCI devices 102 simultaneously. Techniques such as frequency division multiple access (FDMA), orthogonal frequency division multiple access (OFDMA) and orthogonal spreading format can be employed for transmitting the different uplink wideband signals 115 to the WCI devices 102. In the exemplary embodiment, the access terminal 106 includes hardware, software, and firmware not shown in FIG. 4 for facilitating and performing the functions of the access terminal 106. For example, the access terminal 106 may include user interface devices such as a display, microphone, speaker, and keyboard.

Therefore, information originally transmitted by the MIMO base station 104 is received by the WCI devices 102 and transmitted to the access terminal 106 through multiple channels of a wideband frequency spectrum. The wideband signals 114 are demodulated to recover the original MIMO signals that are decoded by the narrowband receiver 406 and multiplexed to produce the high data rate signal 407. For example, where the wideband air interface 118 is a CDMA air interface, a WCI device 102 transmits a received narrow band MIMO signal as a spread spectrum, low power, low spectral density signal over a CDMA channel. Other WCI devices 102 transmit their received MIMO signals on other CDMA channels. The access terminal 106 receives the multiple CDMA channels using a CDMA receiver and the narrowband receiver 406 processes the resulting narrow band signals to receive the original MIMO high data rate signal.

In the exemplary embodiment of FIG. 1, multiple access terminals 106 share the set of WCI devices 102. It is desirable that all the access terminals be able to communicate with all the WCI devices to achieve the highest peak throughput to each user. However, this is not always possible, since some of the access terminals may only be able to communicate with a subset of the WCI devices. In this case, the BS may be instructed through signaling to adapt its MIMO processing to the set of access terminals being served at that point in time and frequency. For example, the base station 104 may choose to code the signals for a subset of the WCI devices, or it may choose to use the remaining set of WCI devices to communicate with other access terminals.

In addition to exploiting the advantages of MIMO techniques and wideband communication such as UWB, the exemplary system provides other operational advantages. When signals are received by any access terminal 106, the access terminal 106 can decode a subset or decode all of the signals and be able to decode the initial data stream, thereby trading off channel capacity for delay without requiring additional retransmissions such as automatic request (ARQ) from the BS 104. The preceding situation may occur, for example, when one or more of the WCI devices 102 experience poor channel conditions in connection with access terminal 106.

Figure 5:
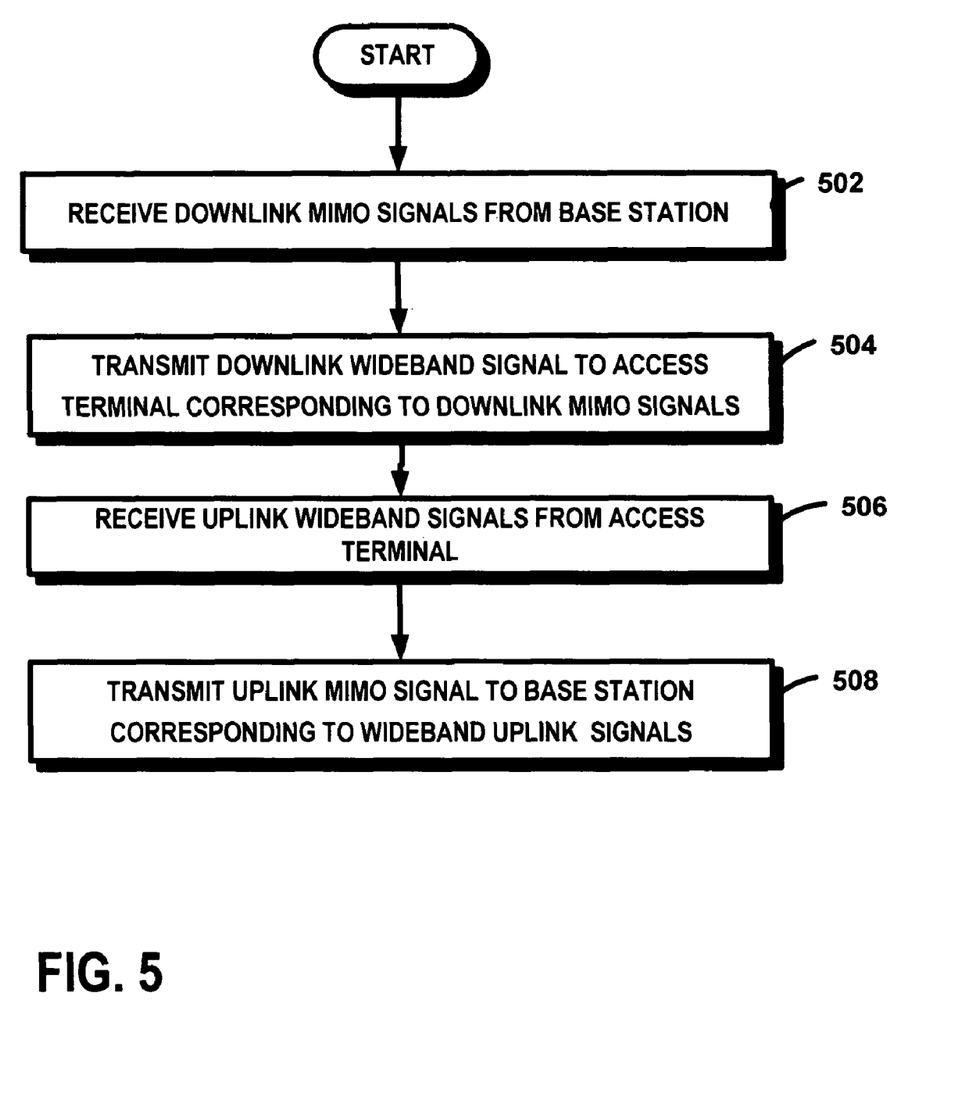
FIG. 5 is a flow chart of a method performed in the wireless communication interface device in accordance with the exemplary embodiment.

FIG. 5 is a flow chart of a method performed in the WCI device in accordance with the exemplary embodiment. The method can be executed using any combination of hardware, software and/or firmware.

At step 502, the downlink MIMO signals 112 from the base station 104 are received by the WCI device 102 through MIMO air interface 110 having a MIMO bandwidth. In the exemplary embodiment, the narrow band receiver 209 in the downlink transceiver 204 downconverts and demodulates the narrow band signals transmitted from the base station 104. The narrow band receiver 209 performs a portion of the functions typically performed by a conventional MIMO receiver since the WCI device 102 includes a single antenna for receiving the downlink MIMO signals 112.

At step 504, the downlink wideband signal 114 corresponding to the downlink MIMO signal 112 is transmitted to the access terminal 106 through the wideband air interface 118 having a bandwidth greater than the MIMO bandwidth. In the exemplary embodiment, the baseband signals recovered by the narrowband receiver 209 are modulated and upconverted by a wideband transmitter 213 in the downlink transceiver 204. The resulting downlink wideband signals 114 are transmitted to the access terminal 106 through the wideband air interface 118.

At step 506, the uplink wideband signals 115 are received from the access terminal 106 through the wideband air interface 118. In the exemplary embodiment, the wideband receiver 219 in the uplink transceiver 214 downconverts and demodulates the uplink wideband signals 115 transmitted from the access terminal 106. The uplink wideband signals 115 are transmitted through the wideband air interface 118 over multiple channels. The wideband signals 115 may be transmitted by the access terminal 106 in accordance with CDMA techniques where several narrowband signals are transmitted on different direct sequence channels that are demodulated by the wideband receiver 219 of the WCI device 102 to receive the narrowband signals.

At step 508, the uplink MIMO signal 113 corresponding to the uplink wideband signal 115 is transmitted to the base station 104 through the MIMO air interface 110. In the exemplary embodiment, the narrowband baseband signals recovered by the wideband receiver 219 are modulated and upconverted by the narrowband transmitter 223. The resulting signals are transmitted through the MIMO air interface 110 to the base station 104. Since multiple WCI devices transmit the narrowband signals from different geographical locations, the resulting combination of signals received at the base station antennas 108 is in accordance with MIMO transmission allowing the MIMO base station 104 to recover the originally transmitted high data rate signal that was separated onto the different wideband signals.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. An apparatus comprising:
a wireless communication interface device configured to exchange, with a base station, multiple input/multiple output (MIMO) signals conveying information through a multiple input/multiple output (MIMO) air interface having a MIMO bandwidth and to exchange, with a wireless communication device, wideband signals conveying the information through a wideband air interface having a bandwidth greater than the MIMO bandwidth.

2. The apparatus of claim 1, wherein the wireless communication interface device comprises:
a narrowband receiver configured to receive a downlink MIMO signal through the MIMO air interface; and
a wideband transmitter configured to transmit a downlink wideband signal corresponding to the downlink MIMO signal through the wideband air interface having an ultra-wideband bandwidth.

3. The apparatus of claim 2, further comprising:
a wideband receiver for receiving an uplink wideband signal through the wideband air interface; and
a narrowband transmitter for transmitting an uplink MIMO signal corresponding to the uplink wideband signal through the MIMO air interface.

4. The apparatus of claim 3, wherein the wireless communication interface device is configured to transmit a channel state information to the base station corresponding to channel characteristics between the wireless communication interface device and at least one base station transmit antenna.

5. The apparatus of claim 4, wherein the wireless communication interface device is configured to process precoded data received from the base station in response to the channel state information transmitted to the base station.

6. A wireless communication interface system comprising:
a plurality of wireless communication interface devices, each of the plurality of wireless communication interface devices comprising:
a downlink transceiver configured to receive downlink MIMO signals conveying information through a MIMO air interface having a MIMO bandwidth and transmit downlink wideband signals conveying the information through a wideband air interface having a bandwidth greater than the MIMO bandwidth; and
an uplink transceiver configured to receive uplink wideband signals conveying other information through the wideband air interface and transmit uplink MIMO signals conveying the other information through the MIMO air interface.

7. The wireless communication interface system of claim 6, wherein the MIMO bandwidth is narrow-band (NB) and the wideband air interface is an ultra-wide-band (UWB).

8. The wireless communication interface system of claim 7, wherein each of the plurality of wireless communication interface devices operate independently of each other.

9. The wireless communication interface system of claim 6, wherein each of the plurality of wireless communication interface devices is configured to transmit channel state information to a base station corresponding to channel characteristics between each wireless communication interface device and at least one base station transmit antenna.

10. The wireless communication interface system of claim 9, wherein each of the plurality of wireless communication interface devices is configured to process precoded data received from the base station in response to the channel state information transmitted to the base station.

11. A base station configured to transmit and receive signals through a MIMO air interface, the base station comprising:
a MIMO pre-coder comprising:
a modulo device connected to a feedback matrix unit responsive to a channel state information, the modulo device providing an output; and
a feedforward matrix unit, responsive to the output of the modulo device and the channel state information, for providing precoded data for transmission through the MIMO air interface; and
a rateless encoder connected to the MIMO pre-coder for encoding the precoded data.

12. The base station of claim 11, wherein the base station is configured for transmitting and receiving signals in a narrow-band bandwidth.

13. An apparatus comprising:
a single-antenna access terminal configured to recover information transmitted from a base station over a plurality of downlink multiple input/multiple output (MIMO) signals by receiving a plurality of downlink wideband signals that convey the information; the single-antenna access terminal comprising:
a wideband receiver configured to generate baseband signals corresponding to the plurality of downlink wideband signals; and
a narrow band receiver connected to the wideband receiver and configured to process the baseband signals to recover the information transmitted by the base station.

14. The apparatus of claim 13, wherein the single-antenna access terminal comprises:
a transceiver comprising the wideband receiver and the narrowband receiver, wherein the
wideband receiver is configured to receive, from a plurality of wireless communication interface devices, the plurality of downlink wideband signals corresponding to the plurality of downlink MIMO signals transmitted from the base station.

15. The apparatus of claim 14, wherein the transceiver further comprises:
a narrowband transmitter for generating a plurality of uplink communication signals corresponding to uplink MIMO signals received at the base station; and
a wideband transmitter connected to the narrow band transmitter configured to transmit uplink wideband signals corresponding to the plurality of uplink communication signals.

16. The apparatus of claim 15, wherein the uplink wideband signals are transmitted simultaneously.

17. The apparatus of claim 16, wherein the single-antenna access terminal is configured to transmit the uplink wideband signals in anyone of FDMA, OFDMA and orthogonal spreading format.

18. A method performed in a wireless communication interface device, the method comprising:
receiving a downlink MIMO signal conveying information through a MIMO air interface having a MIMO bandwidth;
transmitting a downlink wideband signal conveying the information through a wideband air interface having bandwidth greater than the MIMO bandwidth;
receiving an uplink wideband signal conveying other information through the wideband air interface; and
transmitting an uplink MIMO signal conveying the other information through the MIMO air interface.

19. The method of claim 18, further comprising:
determining a channel state information based on channel characterization between the wireless communication interface device and a base station transmit antenna; and
transmitting the channel state information to the base station.

20. The apparatus of claim 1, wherein a MIMO spectral density of data rate per frequency of the MIMO air interface is greater than a wideband spectral density of data rate per frequency of the wideband air interface.

21. The wireless communication interface system of claim 6, wherein a MIMO spectral density of data rate per frequency of the MIMO air interface is greater than a wideband spectral density of data rate per frequency of the wideband air interface.

* * * * *